May 23, 1967  R. L. DONOVAN  3,321,706
COMPARISON VOLTAGE MEASURING CIRCUITS USING
CONDENSER CHARGING AND DISCHARGING
Filed Dec. 23, 1959  3 Sheets-Sheet 1
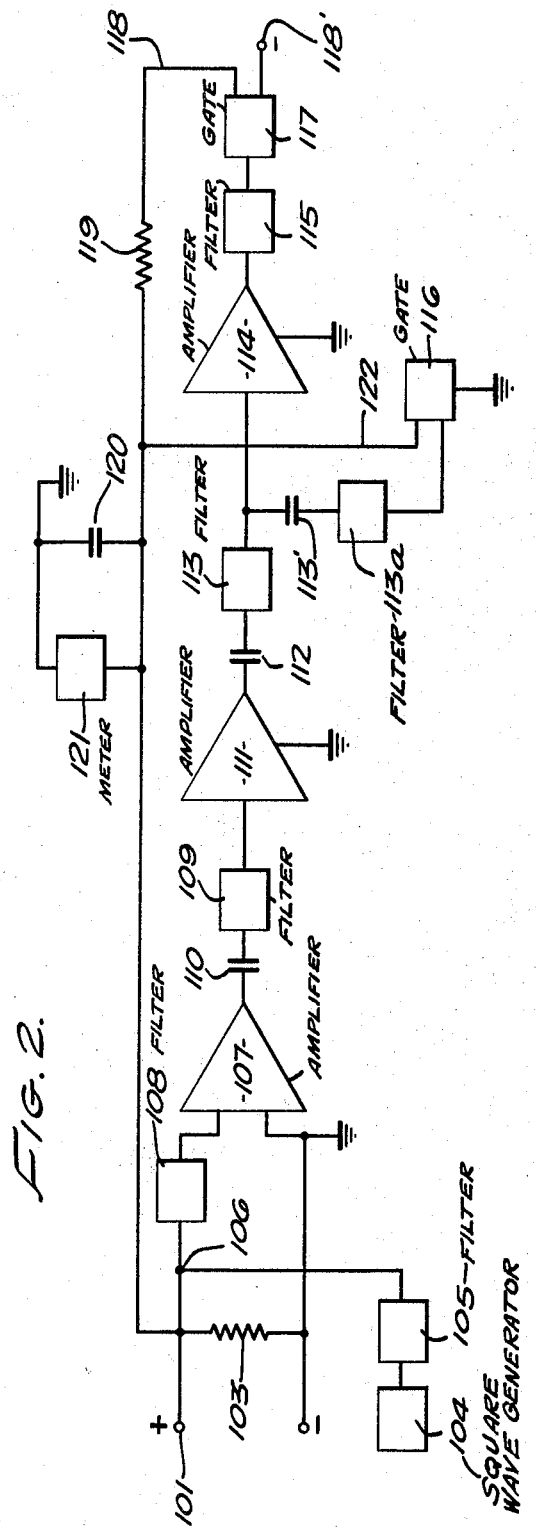
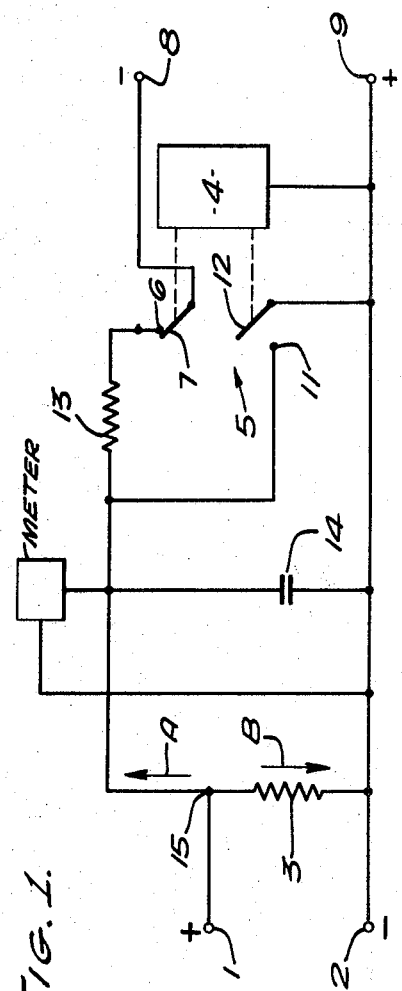
INVENTOR.
RAYMOND L. DONOVAN

INVENTOR.
RAYMOND L. DONOVAN

United States Patent Office 3,321,706
Patented May 23, 1967

3,321,706
COMPARISON VOLTAGE MEASURING CIRCUITS USING CONDENSER CHARGING AND DISCHARGING
Raymond L. Donovan, Santa Monica, Calif., assignor to Statham Development Corporation, Los Angeles, Calif., a corporation of California
Filed Dec. 23, 1959, Ser. No. 861,495
18 Claims. (Cl. 324—111)

This invention relates to the determination and utilization of a signal voltage which is developed at relatively low voltage levels. One of the problems of instrumentation and telemetry resides in the fact that many types of transducers produce signal voltages of such low value that they may not, without amplification, be conveniently measured or utilized in control circuits.

It has been the practice in the past to amplify these signal voltages to higher voltage levels in order that they may be either measured or utilized more conveniently. The problems and costs of such amplification are an old story in this art and need no elaboration for those skilled in this art.

I have made what I believe is a complete departure from this prior art, by employing an entirely different approach to obtain voltages which are related in a determinable manner to the signal voltage but which are at voltage levels as much higher than the signal voltage as may be desired. Broadly stated, my method and circuit employ the following steps and devices:

(1) I generate a reference voltage of constant value at a polarity opposite to that of the signal voltage.

(2) The signal voltage is generated at or converted into a voltage of polarity opposite to the polarity of the reference voltage specified in (1) and is applied at a reference point.

(3) I provide a switching mechanism triggered by the signal voltage source, which signal switching mechanism disconnects or inactivates the reference voltage when the signal voltage at the reference point is reduced by the reference voltage to a predetermined level, which may but need not be a base potential.

(4) I may measure or utilize some function of the voltage or current variation resulting from the switching procedure.

In a preferred embodiment, I connect the signal source across a signal resistance forming part of a voltage summation network, with means in the circuit triggered by the signal to establish a reference potential polarized oppositely to the signal potential and at a substantially higher and constant voltage level and connected to the summation network through an RC time delay circuit forming a portion of said summation network. A switch is provided which is connected to the time delay circuit and to the signal source, such that when the signal voltage is imposed on the signal resistance, said switch connects the voltage source to the summation network; and when the signal resistance has been reduced to a base potential such as ground potential or to the chosen base level, the switch is operated to connect the time delay circuit to the ground or to the chosen voltage level. Thus, for example, when the base potential is ground potential and the signal potential is at a positive potential, the time delay portion of the summation network is established at a high negative potential whose absolute value is greater than the absolute value of the positive signal potential.

In a preferred embodiment, the reference voltage source is an amplifier which has a clamped voltage output with an amplitude and a polarity which remain substantially invariant irrespective of changes in the parameters of the circuit or of the environment; for example, substantially irrespective of aging, temperature changes, or power source variations. Such constant amplitude may be and preferably is obtained, for example, by using an amplifier whose available gain is much greater than that required to develop the above reference voltage. I provide a power source of constant voltage output or, if desired, employ a battery whose output voltage is considerably higher than the required reference voltage. In such case, I may and preferably do use a voltage limiter device; for example, a semi-conductive diode operating in the Zener range, commonly referred to as a Zener diode. This Zener diode is set to limit the output voltage from the amplifier at a level substantially below the battery voltage or below the minimum value of the power source, if such power source is of variable potential.

Since, even though the available gain in the amplifier be many times that necessary to amplify to a voltage level equal to the line voltage established by the power source, as, for example, the battery voltage, the amplifier output is clamped below the available line voltage from the power source. Since there is a great reservoir of unused gain available in the amplifier, variations in the gain resulting from the various common mode variations, for example, temperature, noise, or from changes in component parameters, will not affect the amplifier output which becomes the reference voltage. This reference voltage will remain clamped at the chosen level and thus be of substantially constant value.

It should be noted that in the above arrangement the signal is not amplified, and means are provided to polarize the reference potential. The phase characteristics of the amplification stages do not affect the operation of the system.

By employing an RC delay circuit in the summation network, and in grounding the delay circuit when the signal voltage is reduced to the desired level, I may, by proper design of the time delay in relation to the switching period, provide that this grounding of the RC circuit occur when the capacitor is charged to but a minor, i.e., less than 50% and preferably less than 25%, of the full charge capacity of the condenser available in the circuit. In such case, the charge on the condenser of the RC time delay circuit is a substantially linear function of the charging time.

The RC circuit, in connection with the grounding switch, generates in the summation network a sawtooth pulse of substantially right triangular shape, whose hypotenuse has a slope depending upon the RC time constant and in which the altitude and the base are each proportional to the magnitude of the signal voltage. Since the base of the pulse is the period of the triangular pulse, and the altitude is the amplitude of the triangular pulse, the frequency and amplitude of this triangular pulse becomes a measure of the magnitude of the signal voltage, as will also the potential to ground of the RC time delay circuit.

The above principles may be applied to a steady or varying D.C. signal. They may also be applied either to a pulsating signal of constant polarity, i.e., square shape, or to a sinusoidal or other wave shape which is either in the form of a constant polarity but varying amplitude, providing that the frequency of the sawtooth pulse is many times greater, for example, 10 to 20 times greater, than the frequency of the signal voltage variation.

When the signal is a weak D.C. signal, I prefer to modulate the signal by a square wave signal from a multivibrator, flip-flop, or other square wave generator, whose alternating square wave has been rectified and passed through a voltage limiter such as, for example, a Zener diode, to produce a square wave pulse of constant amplitude and at a polarity opposite to the signal polarity. This pulse is added to the signal potential. Assuming, for example, that the square pulse is negative and is added to a positive signal potential, the result is an alternating wave having a positive part whose amplitude is proportional to the absolute value of the positive signal. I amplify this alternating potential and rectify the output of the amplifier to produce a negative pulse.

It is to be noted that whether or not the amplified pulse varies in amplitude or frequency is of no significance, since the relationship, other than polarity, between the signal potential and the frequency or amplitude of the output pulse from the amplifier and rectifier is not relied on in my circuit for purposes of either measurement or utilization of the signal.

The negative pulse is fed back through an RC time delay circuit, as described above, and algebraically added to the signal voltage, as described above.

These objects and other objects of my invention will appear more fully from the following description of a preferred embodiment of my invention, taken together with the schematic circuit diagrams shown in the attached drawings, of which:

FIGURE 1 is a schematic diagram of the basic circuit, illustrating the principles of my invention;

FIGURE 2 is an elaboration of the diagram of FIGURE 1, and in block form illustrates the principles of my invention;

Figure 3:
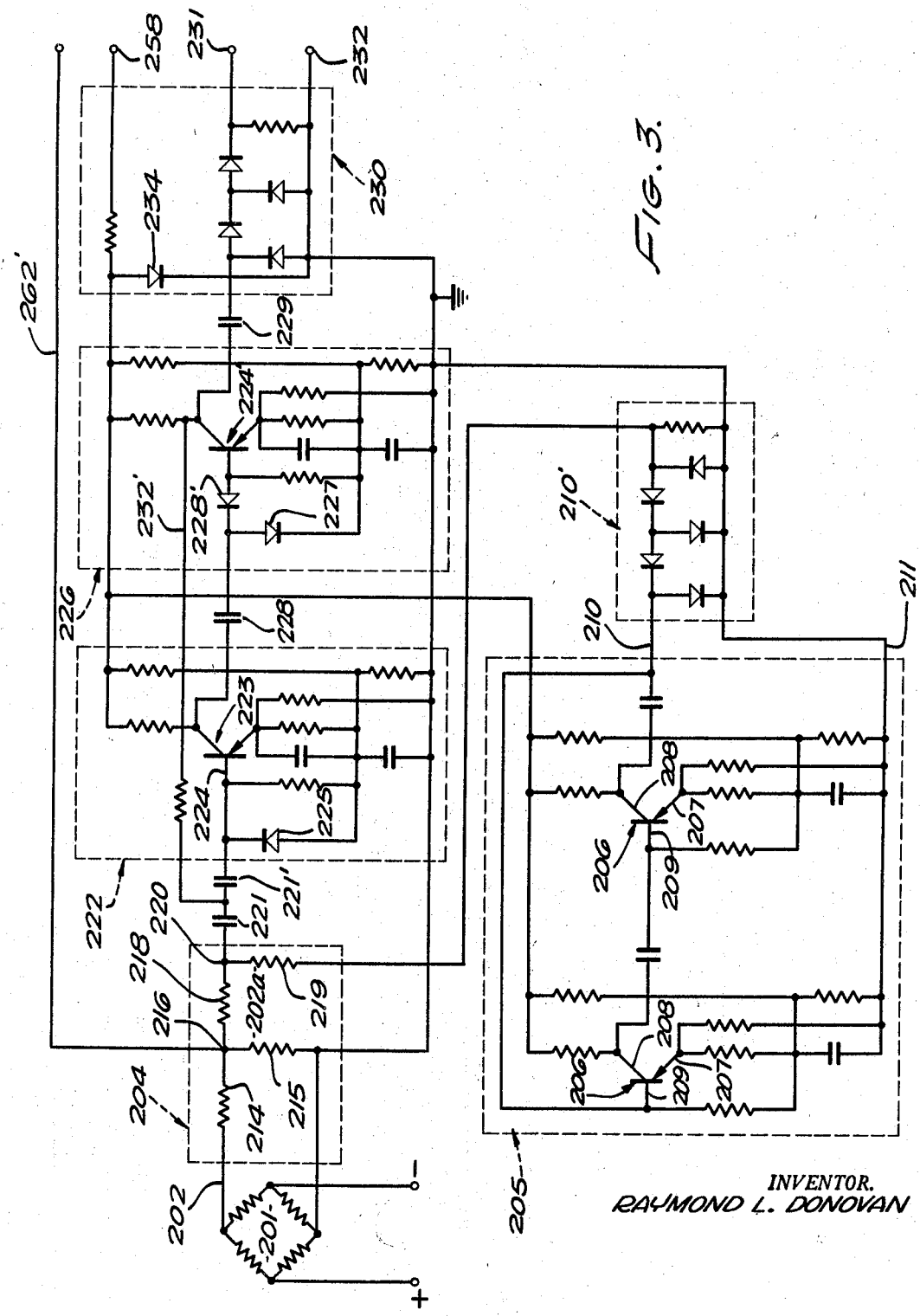
FIGURES 3 and 3A illustrate a further elaboration of the diagram of the circuit of my invention for computing or using the signal voltage.

The schematic circuit in FIGURE 1 is not intended to illustrate a practical circuit, but merely to illustrate the principles upon which my invention is based. Assuming a signal is established at 1, 2 such that 1 is positive with respect to 2, which may then be termed to be negative. Shunted across 1 and 2 is the resistance 3 herein referred to as the signal resistance. A fixed voltage is applied at 8 and 9 (which may be assumed as a ground or reference potential) such that 8 is negative and 9 is positive and at a constant potential. In series with 3 and 8 is a switch 5 with switch contacts 6 and 7 which will be assumed to be operated by operator 4 in the manner to be described below. The switch acts such that when contacts 6 and 7 are closed, contacts 11 and 12 of the switch are open; and when contacts 11 and 12 are closed, contacts 6 and 7 are open.

Let us assume that 4 operates the switch 5 in a manner such that when the signal potential is established across the resistance 3, the operator 4 operates the switch to close contacts 6 and 7 and open contacts 11 and 12. It will be seen, then, that under these circumstances 3 is placed in series with resistance 13 and terminals 8 and 9. The condenser 14 and resistance 13 form an RC time delay circuit. Condenser 14 starts charging from the high potential source 8 and 9 at a rate controlled by the RC time constant of the delay circuit; and the current (see arrow B), initially flowing when the signal potential was fully established across 3, diminishes due to the reverse current (see arrow A), until point 15 is reduced to the potential at 2, at which time no current passes through 3, since there is no potential drop between 2 and 15, a null voltage condition is established across resistance 3, and thus no current flow is present in 3. Point 15 is thus termed the reference point of the summation network.

Let us assume that, when this condition exists, the operator 4 actuates the switch to open the circuit between 6 and 7 and close the circuit between 11 and 12. When this is done, the condenser 14 is short circuited and connected to 9, through 11 and 12. The signal potential is again established across 3, and 4 operates the switch to again disconnect 11 to 12 and connect 6 to 7, thus again reducing the signal potential at 3 and repeating the cycle. The potential at 14 will rise and fall as a series of triangular pulses whose time base depends upon the frequency at which the switch 5 is operated and whose amplitude depends on the signal potential and time interval for operation of the switch and whose hypotenuse has a slope depending on the RC time constant of the RC delay circuit.

While the above description employs potentials at various points, as illustrated for purposes of description, it will be understood that the signs of the potentials are significant only in that the system must be polarized such that the signal potential at 1 is of sign opposite to the potential at 8, and at a much lower magnitude.

If the signal potential in the above system is viewed as an error signal, the system may be viewed as a servo system with the RC delay circuit viewed as the return of the servo loop to reduce the error signal, i.e., the signal voltage imposed at 1 and 2, to zero.

FIGURE 2 illustrates in schematic form an electrical circuit for achieving the generic functions illustrated in FIGURE 1.

A carrier wave oscillator, preferably but not necessarily in the form of a multivibrator, flip-flop, or other means for generating an alternating square wave shown at 104, is connected to a filter shown at 105, so polarized as to pass only that portion of the alternating wave whose polarity is opposite to the polarity established by the signal at 101, the signal being applied at 101 and 102 across the signal resistor 103. For purposes of illustration, I will again assume that 101 is positive. 105 is then polarized to pass only the negative half of the alternating square wave. The rectifier filter is connected at 106 to modulate the signal potential and to convert the half wave into a full wave, the D.C. level at 101 being added to the half wave. Since 101 was assumed to be positive, I will obtain at 106 a full wave whose positive half has an amplitude established by the D.C. level at 101.

The modulator is connected to the amplifier 107, through the rectifier 108, so that the positive portion of the wave is passed to the amplifier. The output of the amplifier is coupled to the filter 109 by the condenser 110, so that the negative pulse passes to the amplifier 111. The positive pulse issuing from the amplifier passes through the condenser 112 and filter 113 and the positive pulse passes to the amplifier 114. The negative pulse appears at the output of the amplifier 114. The output of the amplifier 114 passes through the filter 115, which removes any positive tail to the pulse. Two gates, 116 and 117, are employed to produce the switching effect described in connection with FIGURE 1. The gate 117 is triggered by negative pulses from the filter 115 to become conductive and is made non-conductive when no pulse potential is presented at 117. When 117 becomes conductive, the return loop at 118 is connected to 117 and to a constant voltage source which is maintained at a substantially fixed negative potential from 118'. A current flow results through the delay circuit composed of resistances 119 and the grounded condenser 120, back to point 101, the reference point, to oppose the current and potential established by the signal at 101, 102, across 103, in the manner described in connection with FIGURE 1. This establishes null voltage conditions across 103 when the potential at the reference point 101 reaches the base potential at 102.

Gate 116 is triggered by the positive pulses normally coming from 113 via condenser 113' and filter 113a, and is blocked thereby, and the circuit through 122 is open. When the null voltage conditions are established across 103, only negative pulses are presented to 107. No positive pulses now being presented to 116, 116 unblocks, short-circuiting the condenser 120, connecting 120 to ground. Condenser 120 then discharges substantially instantaneously, whereupon the signal voltage is reestablished across 103, and the cycle is repeated. I may measure by meter 121 the frequency or other parameter of the current in the RC circuit as a measure of the potential at 101, as will be more fully described below in connection with FIGS. 3 and 3A.

It will be observed that I employ a sufficient number of pulse amplifiers to insure that a positive pulse is applied to gate 116 and a negative pulse to gate 117. Where the pulse applied to the amplifiers 107 is positive, this will require an odd number of amplification stages, i.e., at least three.

Figure 3A:
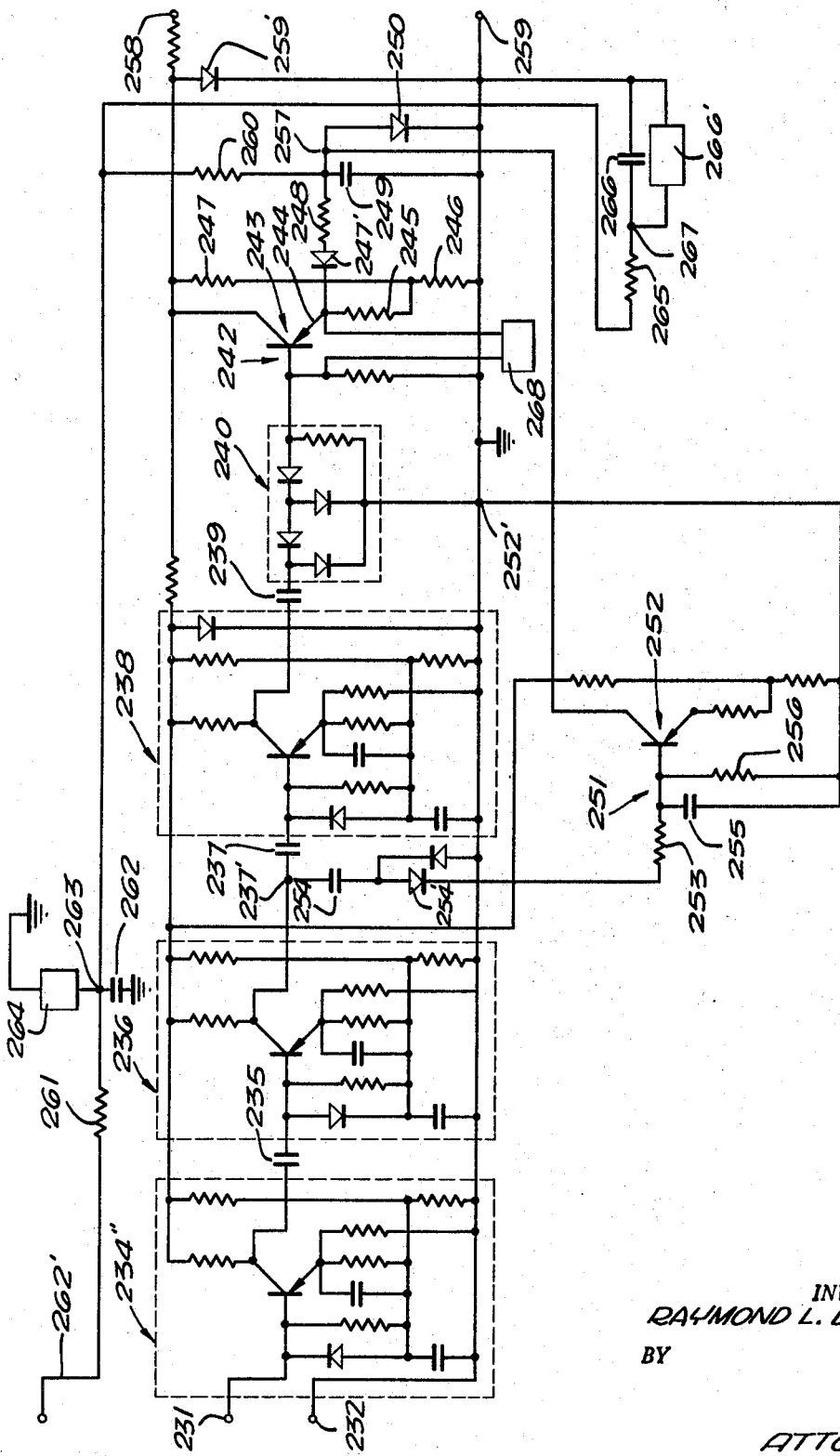

In FIGURES 3 and 3A, I have illustrated a schematic circuit diagram suitable for implementing the principles discussed above. The components are illustrated by conventional symbologies. For purposes of illustration only, I will describe this in connection with the measurement of a D.C. voltage produced by a transducer, such as a strain gage resistance bridge 201; and we will assume that the bridge is unbalanced to establish a positive potential at 202. The modulator 204, composed of a voltage summation network 202a, composed of resistances 214, 215, forming a voltage divider whose upper leg is 214 subjoined to the lower leg 215 at a junction point 216, 218 and 219; 215 being termed the signal resistance, the signal being applied at 216, 218 and 219. 216 is thus the reference point. The multivibrator 205 is of conventional construction and may be of any suitable design. The one illustrated employs PNP transistors 206 and emitters 207, collector 208 and base 209, interconnected in a conventional manner to produce a square wave of desired frequency; for example, in the case illustrated, 250 to 1000 kilocycles. The transistors, resistances and condensers and diodes in the FIGURES 3, and 3A are illustrated by conventional symbolism as they are throughout the figures.

The output of the multivibrator appearing at 210, 211 is passed through a polarized filter or rectifier 210' of conventional design. The filter is polarized to pass only the negative half of the alternating square wave generated by the multivibrator, and this is applied through the resistor 219 to the modulator at 220. The other terminal of the filter goes to ground. The polarized negative pulse from the rectifier 210' is applied and summed with the D.C. voltage from 201 applied at 216. The result is an alternating wave in which the amplitude of the positive half of the wave is the D.C. potential at 220 obtained from 216. The modulator is capacitatively coupled by the condenser 221 and 221' to a first stage polarized amplifier 222 having an amplifying transistor 223 of the PNP type, conventionally connected for voltage amplification purposes. To the base 224 of the transistor 223 is connected a semiconductive diode 225, polarized to pass the negative half of the wave to ground and block the positive part of the pulse which passes to stage 2. The output of 222 is coupled by condenser 228 to a second polarized amplifier stage 226, of design similar to that of stage 1 except that a diode 227 is polarized to shunt the positive pulses to ground and to block the negative pulses which pass to the transistor 224' and diode 228'.

The output from the second stage is capacitatively coupled by condenser 229 to the polarized filter rectifier 230, polarized to pass positive pulses and block negative pulses, and thus any negative tail remaining in the pulse passing from condenser 229 is removed. It will be observed that in this portion of the circuit the high frequency square wave generated by the multivibrator is converted into a unipolar pulse by the polarized filter rectifier 210' and modulates the D.C. signal from the transducer 201, which is of a polarity opposite to the polarity of the half wave passing from 210'. The modulated signal is an alternating wave, as described above. The resultant wave is amplified in an amplifier 222 and 226 associated with filters which remove any accidental, unwanted polarity, to provide at 232 and 231 an output amplified and cleaned by the polarized filter to produce a clean, unipolar pulse at the frequency generated by the multivibrator; in this case, as illustrated, a positive pulse appears at 231, 232.

A feedback loop 232' is provided from the collector of the transistor 224' back to the base of transistor 223 between the condensers 221 and 221'. The power (see below and FIG. 3A) to the polarized amplifier is applied at 258, and its voltage is limited by the Zener diode 234. The circuit shown at FIGURE 3 thus acts as a chopper to convert the D.C. signal applied at 216 into a pulse of like polarity and desired amplitude. The power applied to the amplifier at 231 and 258 is clamped at a maximum voltage level by means of the Zener diode 234.

This chopping circuit is employed in the system of my present invention for the purpose of generating the pulse of desired polarity and frequency, in which case the linear proportionality between the amplitude of the output pulse and the input signal is of secondary importance.

The relatively clean, positive pulse appearing at 231–232 passes to an odd number of polarized amplification stages. The third stage (stages 1 and 2 are shown in FIG. 3 described above) is shown at 234". It is substantially the same as stage 222, and the output from this stage is capacitatively coupled by condenser 235 to stage 236, which is of design the same as stage 226.

The output of stage 236 is capacitatively coupled by condenser 237 to stage 238, of design the same as stage 222; and the output of stage 238 is capacitatively coupled by condenser 239 to the polarized filter rectifier 240, polarized to pass negative portion of the wave and to present at the output of the polarized filter a substantially clean negative wave. Thus the polarity of the pulse entering at 231–232 is inverted and appears amplified at the output of 240.

It is to be noted that the number of stages of amplification employed are not critical, so long as there is presented to the condenser 262 in the RC time delay circuit 262', a clean negative pulse with substantially no positive tail and that the number of stages of amplification are sufficient to give a high gain, as has been stated above and as will be more fully set forth below.

The polarized filter 240 is connected to a gate 242. The gate as illustrated is composed of a PNP transistor 243, whose base is connected to the output of the polarized filter. The emitter 244 is connected to ground through resistors 245 and 246, and the emitter 244 is also connected to the negative terminal through resistor 247. The emitter is also connected through the diode 247', polarized to conduct negative pulses and to block positive pulses. The diode is also connected through resistor 248 to the negative plate of the condenser 249, whose positive is connected to ground. A Zener diode 250 is connected across the condenser 249 to act as a voltage limiting device to establish a maximum negative potential at the negative plate of 249.

A gate described below is provided at 251. The gate 251 is connected to the output of stage 236, or at any other point at which positive pulses appear. The base of the transistor 252 is connected to 237' ahead of condenser 237, where positive pulses appear, through resistor 253 and condenser 254 and diode 254'. The base of the transistor 252 is also connected to ground through condenser 255 and the parallel resistance 256, and also via a diode which is polarized to block positive pulses. The emitter is connected to ground at 252', and the collector to the negative side of the diode 249 at 257.

The power source is established at 258 and ground at 259, and the potential is clamped by a voltage limiter such as Zener diodes 250 and 259'.

The negative plate of the condenser 249 is connected through resistances 260 and 261 to the point 216 in FIGURE 3. A condenser 262 is connected at 263 to 216 (FIG. 3) via resistance 261 and to ground.

A meter 264 may be shunted across the capacitor 262 for measuring and recording purposes, as will be described more fully below; and for similar purposes the R.C. circuit, including resistances 260, 261 may be connected through resistance 265 to an integrating condenser 266 and the condenser shunted by any recording device 266' or the potential utilized for telemetry purposes, as will be more fully described. Additionally a pulse counter or other pulse integrating and counting means 268 may be connected across the output of the polarized filter 240 and the emitter 244.

The operation of the device, which will be understood from the above, is as follows.

The rectified negative square pulse produced by the multivibrator 205-polarized filter 210' combination, when added to the D.C. potential established at 216 in the modulator mixer 204, adds the D.C. level of the signal to the negative pulse, and there appears at the condenser 221 an alternating square wave produced by the modulation of the negative pulse by the D.C. signal. The resultant A.C. signal is amplified in stage 1 (222) and stage 2 (226), employing by-pass diodes 225 and 227 which, acting with the polarized filter 230, result in the production of a positive pulse at 231 and 232 having substantially no negative tail or component. The system thus may be viewed as a pulse generator to chop the signal applied across 215 and to a series of pulses of like polarity.

If the system is maintained stable, the amplitude of this pulse will be proportional to the DC signal. For purposes of the invention of this application, this proportionality is of secondary importance, and the stability of the chopper, i.e., its gain, is of secondary importance.

The output of the polarized filter 231, 232 is fed to a three-stage polarized amplifier 234", 236, 238. It will be observed that every other stage is of the same configuration, although the parameters may not be identical. The stages 222, 234", and 238 are alike; and 226 and 236 are alike; and these two systems of stages differ in the polarization of the by-pass diodes shown as 225 and 227 in stages 222 and 226. It will be seen also that, due to the nature of the transistor circuit, there is a 180° reversal of polarity at the output of each stage, producing a substantially pure unipolar pulse. Each stage is thus a phase converter as well as an amplifier. Thus, there will appear in the configuration shown at FIGURE 3A at the output of stage 238 a negative pulse which is substantially free of positive component.

The gain in the amplifier system is amply sufficient to amplify the pulse appearing at the input to stage 222 to a value equal to line voltage at 258 and is made large enough so as to be capable of reaching line voltage at 258, as clamped by the Zeners 250 and 259', which act as voltage limiters. In order further to fix the maximum amplitude of the pulse passing from the polarized filter 240 through the gate 242 and appearing in the return delay circuit 262', the potential is clamped by a voltage limiter in the form of a Zener diode 250 across the condenser 249 in series with the return delay circuit line 262' at a voltage level substantially below that at 258. For reasons to be more fully described below, the condenser 249 is made to be of capacity such that it is at substantially constant charge at the potential across the Zener 250, irrespective of the charge and discharge cycle of the condenser 262.

As described previously, the return loop 262', including the resistance 260, 261 and the condenser 262, is connected to resistance 215 and 216. A bidirectional gate composed of gate 251 and gate 242, each of conventional design, is employed to pass the negative pulse to the condenser 262 through the gate 242, to charge the condenser 262 and to by-pass the condenser to ground through gate 251 and thus discharge the condenser 262 when the current flow in 215 produced by the transducer 201 has been reduced to zero. This occurs when the condenser 262 has risen to potential to establish a balancing negative potential at 216 equal to the positive potential established by the transducer 201. Open circuit conditions in 215 are thus established by operation of the gate 251.

The charging gate 242, which when conductive results in charging of the condenser 249, employs a transistor 243, normally arranged for cut-off operations under no-signal conditions applied to the base of the transistor 243, as occurs when open circuit conditions exist at 216.

At this point no voltage drop will appear between the emitter 244 and the ground 259. With the arrival of negative pulses from the preceding polarity filter 240, 243 immediately becomes saturated and conductive, and remains conductive so long as negative pulses pass from the filter 240; and a voltage will appear across the integrating condenser 249, due to the charging current resulting from the potential established across 245 and 246. The Zener diode 250 limits the maximum potential to which 249 may be charged. When the negative feedback through 262' functions to establish open circuit conditions across resistor 215, no signal appears at the base of the transistor 243 of the charging gate 242, and the charging gate becomes inactivated, i.e., is blocked.

The discharging gate 251 when conductive discharges the condenser 249 through the transistor 252 to ground at 252'. This causes a discharge of the condensers 249 and 262. The transistor 252 is arranged as an emitter follower to draw maximum current and has the collector tied across the condenser 249 and Zener 250, and the emitter tied across the diode 259'. The excitation for transistor 252 is obtained by connecting the base of the transistor to the output of one of the stages (stage 236), passing a positive pulse which is passed through the filter composed of 254' and 253' to present a clean positive pulse to the base of the transistor 252 of the discharging gate. The condenser 255 and resistances 256 and 253, which act as an integrating network, cause this transistor 252 to block and be unable to pass current when positive pulses are presented at the base. The integration time factor associated with the transistor 252, resistances 253, 256 and condenser 255 is just slightly longer than the time interval of one pulse as is determined by the RC value of this capacitor and resistances. The values are made such that the charging rate of condenser 255 is sufficiently short to actuate the discharging gate to cause a blocking of the transistor 252 substantially instantaneously, and the resistance 256 is made sufficiently large to maintain a potential at the base of transistor 252 sufficient to hold the gate blocked for a period equal to slightly more than the period of the positive pulse and then to unblock instantaneously when this positive pulse disappears.

Thus, as long as positive pulses appear at the input to the base of transistor 252, and the negative pulses appear at the base of the transistor 243 of the charging gate 242, a charging current will flow through 262' and the by-pass to ground from 257 will be blocked by the discharging gate. When the null voltage conditions appear at 215 and no pulses appear at the base of the transistors of the charging and discharging gates, transistor 252 will unblock and therefore short circuit the feedback delay circuit 262' to ground via 257 and 252'.

It will be seen from the above that the output from the polarized amplifier, as appearing in line 260, is a negative square wave at a frequency of the multivibrator. The condenser 262 charges at a rate determined by the RC time constant of the delay circuit. The cut-off, i.e., the operation of the discharging gate 251 to shunt the condenser 262 to ground, occurs when the condenser 262 is charged to a value proportional to the DC potential established by the signal across 215.

Since the charging rate of the condenser 262 is substantially linear and fixed, by reason of the fact that the signal is made to be but a small fraction of the full charge capacity of 262, the triangular pulse which is thus generated by this cut-off has both an altitude and base directly proportional to the signal voltage.

The following example is given as illustration and not as a limitation of my invention.

Assume that the signal potential establishes 1/10 of a volt across resistance 215, and assume that the pulse rate of the multivibrator is 1,000 kilocycles. The RC time delay circuit is designed so that the capacitor 262 reaches a charge of 0.1 volt in a time just slightly greater than the time of one pulse, for example, about half a microsecond, at which time the discharging gate unblocks instantaneously to short the condenser 262 to ground 252' and to reduce the potential and the potential at 216 to ground 259.

In order to insure the linearity of the charge rate during the period of charge of 262, the maximum charge on capacitor 262 is made to be a minor fraction of the total available charge presented to the condenser 262, i.e., the voltage across the diode 250 as divided by the resistances in the RC return circuit and established at 263. It will be observed that during this charge period, while the bucking current is flowing counter to the current established by the transducer 201, some discharge of the condenser 249 occurs. This condenser, in connection with the resistances connected thereto, is designed so that it has a charge capacity and an RC time constant such that during the period that 262 is charging the condenser potential at 249 varies but in an insubstantial degree, for example, less than 1% or preferably less than ½% of the charge on 249. In this manner the potential at 257 is maintained at a substantially constant negative value and the charge rate of condenser 262 maintained substantially constant.

Under these conditions there is developed in the delay circuit 262' a triangular pulse in the form of a right triangle whose slope is of constant value and determined only by the RC time constant of the delay circuit 262' and whose altitude and base are proportional to the signal potential. So long as the signal potential is at a constant D.C. level the base and altitude of the pulses will remain constant, and there will appear at 263 a train of triangular pulses whose period is equal to the base of the right triangle and whose amplitude is equal to the altitude of the right triangle, and both proportional to the D.C. signal voltage.

Therefore, in order to read the value of the signal at 215, we may connect a frequency meter between 263 and ground or base potential and thus determine the frequency and therefore a measure of the signal voltage, or introduce any voltmeter to measure the potential to ground at 263 by integrating the pulses or by measuring the root mean square value, as is conventional and will be well understood by those in the art.

It will also be noted that the absolute value of this potential can be made entirely independent and at any arbitrarily desired higher level, than the potential across 215, by establishing the desired value of potential across the condenser 249 and the diode 250 and by proportioning the resistances 260 and 261. Further, it will be observed that the shape of the wave appearing at 263 and its frequency has no relationship to the wave generated in the multivibrator or as amplified in the amplifiers, since the multivibrator, amplifier and gates act merely to establish a potential source of fixed value at 249 and to provide the switch which I have described in connection with FIGURES 1 and 2. I may, therefore, employ simple circuitry and circuit elements. I need not employ elaborate stabilization procedure usually necessary in amplification by transistor circuits generating signals at low voltage levels, usually necessary to avoid variations due to aging or accidental or environmental circumstances.

Furthermore, I may also, instead of measuring the signal appearing at 263, employ this signal whose value is thus related in a determinable manner to the signal at 216 for purposes of telemetry by any conventional device. For example, I may pass it through an integrating circuit composed of the resistance 265 and integrating condenser 266 and employ the potential appearing at 267 as a measure of the signal potential or for any purpose, such as telemetry.

I have above illustrated the operation of my invention by an assumed example where the signal potential was 0.1 volt. The following example is also given by way of illustration, and not as a limitation of my invention.

Assume now that the signal across resistance 215 is 10 volts, instead of 0.1 volt as previously assumed, and, since the time constant of the feedback network does not change, and the current flowing through 262 is now 100 times greater than in the previous case, the number of pulses which must be supplied to the transistor 243 in order to permit the capacitor 262 to charge to a potential sufficient to establish a potential 100 times as great as in the previous case will, if the frequency of the multivibrator is not changed, be 100 times as great. The capacitor 262 will charge to this potential in about 100 pulses and then be short circuited to ground. It therefore appears that, for any value of the transducer current through the resistor 215, the number of pulses appearing at the positive gate 243 will be directly proportional to the magnitude of the transducer potential established across resistor 215.

The cut-off potential for the capacitor 262 being 100 times greater, the base of the triangle is 100 times greater, and the period of the triangular pulse is therefore 100 times as great as is its amplitude; and these, therefore, are directly proportional, as shown, to the magnitude of the transducer signal.

If the signal applied to the resistance 215 is a positive pulse or an A.C. signal, the system may also be employed in the same manner, provided that the frequency of the multivibrator is in the order to 10 to 20 or more times the frequency of the pulse or A.C. signal. The positive pulse and the positive half of the A.C. signal are modulated by the multivibrator square wave. In such case, each triangular pulse sees a substantially constant potential across the resistor 215, the envelope of the amplitude of the succeeding pulses, generated at 262 will correspond to the A.C. or pulse signal across 215, the triangular waves modulating this carrier the same way as the carrier wave is modulated by the multivibrator.

In the above circuits, for purposes of illustration, we have assumed certain polarities. These polarities may be all reversed, so long as the polarity relationships in various stages are maintained similarly so that the feedback in circuit 226 be at an opposite potential to the potential established by the signal at 202. The gates may be interchanged to fire in the same sequence but at opposite polarities of the transmitted and amplified pulse.

While PNP transistors have been employed in the circuits, NPN transistors or other amplifying and pulse generating elements may be used. The particular organization of each of the circuit elements to produce their individual functions is not claimed to be a part of this invention, and any conventional circuit element which functions in the same manner may be employed, the invention residing in the unique organization of the circuit elements and circuit functions to produce the novel result illustrated generically in FIG. 1 and FIG. 2 and shown in a specific and preferred embodiment in FIGS. 3 and 3A.

While I have described a particular embodiment of my invention for the purpose of illustration, it should be understood that various modifications and adaptations thereof may be made within the spirit of the invention as set forth in the appended claims.

I claim:

1. A voltage computer circuit including resistance network means to establish a signal potential between a reference point and a second point on said network, a substantially constant potential source of polarity opposite to the signal potential at said reference point, said substantially constant potential being of magnitude substantially greater than the magnitude of said signal potential at said reference point, an RC time delay circuit connecting said reference point and said potential source, said RC circuit including a condenser, a by-pass connection short circuiting the condenser of said RC circuit to base potential, switch means connecting said potential source to said reference point when said signal potential is established at said reference point, and substantially simultaneously to open the said by-pass short circuit connection to said base potential, said switch means also having means to disconnect the said potential source from said reference point when the potential at said reference point is substantially that at said second point and substantially simultaneously to close the said by-pass circuit to shunt the condenser to said base potential.

2. In the voltage computer circuit of claim 1, said voltage computer circuit including a voltage summation network comprising a bridge circuit including means to apply an excitation current source to said bridge and means to derive a signal potential from said bridge, said means including said reference point.

3. In combination with the voltage computer circuit of claim 1, means to measure a parameter of the current in said RC time delay circuit as a measure of the said signal potential.

4. In the circuit of claim 3, means responsive to a parameter of the current in said RC time delay circuit.

5. A voltage computer circuit comprising a voltage summation network including resistance, means to establish a signal voltage across said resistance to establish a potential at a reference point in said resistance referred to a base, means to generate a reference potential at a polarity referred to said base opposite to the polarity of the potential at said reference point, means to generate a square wave pulse of constant polarity opposite to the polarity at said reference point, means to add said pulse in said summation network to modulate the reference potential and to generate an alternating square wave, a polarizing amplifier filter connected to said summation network to amplify and filter said alternating wave to produce a unipolar pulse of polarity like that of the signal potential at said reference point, a phase inverter-amplifier connected to said amplifier-filter to invert the polarity of said pulse, a first gate connected to said last named phase inverter-amplifier and triggered to become non-conductive by said pulse of inverted phase from said phase inverter-amplifier, a second phase inverter-amplifier connected to the output of said first mentioned phase inverter-amplifier, a second gate connected to the output of said second mentioned phase inverter-amplifier, said second gate being conductive when triggered by a pulse of polarity opposite to the polarity at which said first mentioned gate is triggered, a source of potential of polarity opposite to the polarity at said reference point, said second gate connected to said potential source, an RC time delay circuit connected to said second gate and to said reference point, a condenser in said RC circuit connected to the base, a shunt connection across said condenser connected to said base, said first mentioned gate being connected in said shunt, whereby on establishment of said signal potential at said reference point, said first named gate is made conductive and said shunt connection is blocked and said second gate establishes a conductive path from said potential source to said condenser, whereby when the signal potential is reduced to base potential, said condenser is shunted to said base.

6. In the circuit of claim 5, means to measure a function of the current in said RC circuit as a measure of said signal voltage.

7. In the circuit of claim 6, said measuring means including means to determine the frequency of the charge and discharge of the condenser in said RC time delay circuit.

8. In the circuit of claim 7, said measuring means including means to measure the AC potential across said condenser.

9. In the circuit of claim 5, power input terminals, a second condenser between the output of said second gate and said power input terminals and the said base, a voltage across said second condenser, said voltage limiter limiting the charge on said second condenser with respect to base at a substantially higher potential with respect to said base than the potential with respect to the base established by said signal potential at said reference point, one of the poles of said second condenser connected to said RC time delay circuit and the other pole of said second condenser connected to said base, the capacity of said second condenser being substantially higher than the condenser in said RC time delay circuit whereby the charge on said second condenser is varied by a small fraction of the total charge on the second condenser, when said RC time delay circuit is connected to said voltage source.

10. In combination with the circuit of claim 9, means to measure a function of the current in said RC circuit as a measure of said signal voltage.

11. In the circuit of claim 10, said measuring means including means to determine the frequency of the charge and discharge of the condenser in said RC time delay circuit.

12. In the circuit of claim 11, said measuring means including means to measure the A.C. potential across said condenser.

13. In the circuit of claim 10, a pulse integrating circuit connected to said second gate including an integrating condenser and resistance and means to measure the potential at said condenser.

14. In the circuit of claim 9, said means to establish a square wave pulse including a multivibrator, a polarizing filter connected to said multivibrator and to said reference point.

15. In combination with the circuit of claim 14, means to measure a parameter of the current in said circuit.

16. In the circuit of claim 14, means to measure a function of the current in said circuit as a measure of said signal voltage.

17. In the circuit of claim 14, said measuring means including means to determine the frequency of the charge and discharge of the condenser in said RC time delay circuit.

18. In the circuit of claim 14, said measuring means including means to measure the A.C. potential across said condenser.

References Cited by the Examiner
UNITED STATES PATENTS

| | | | |
|---|---|---|---|
| 1,254,620 | 1/1918 | Newman | 324—111 |
| 2,059,786 | 11/1936 | Gilbert | 324—99 |
| 2,501,704 | 3/1950 | Wilson | 324—99 |
| 2,591,511 | 4/1952 | Clarke | 324—111 |
| 2,715,209 | 8/1955 | Williams | 324—99 |
| 2,835,868 | 5/1958 | Lindesmith | 324—111 |
| 2,897,445 | 7/1959 | Goodale | 324—111 |
| 2,994,825 | 8/1961 | Anderson | 324—111 |
| 3,024,658 | 3/1962 | Huddleston | 324—106 |

WALTER L. CARLSON, *Primary Examiner.*

E. SAX, FREDERICK M. STRADER, *Examiners.*

R. V. ROLINEC, *Assistant Examiner.*